(12) United States Patent
Lee et al.

(10) Patent No.: US 12,431,514 B2
(45) Date of Patent: Sep. 30, 2025

(54) AIR COOLER AND FUEL CELL SYSTEM

(71) Applicants: HYUNDAI MOTOR COMPANY, Seoul (KR); KIA CORPORATION, Seoul (KR)

(72) Inventors: Ju Yong Lee, Suwon-si (KR); Sang Woo Kim, Chuncheon-si (KR); Yeon Su Nam, Bucheon-si (KR); Min Jae Kim, Hwaseong-si (KR); Ho Kyo Jung, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 787 days.

(21) Appl. No.: 17/833,097

(22) Filed: Jun. 6, 2022

(65) Prior Publication Data

US 2023/0099737 A1    Mar. 30, 2023

(30) Foreign Application Priority Data

Sep. 29, 2021   (KR) .................. 10-2021-0129213

(51) Int. Cl.
*H01M 8/04119* (2016.01)
*H01M 8/04007* (2016.01)
*H01M 8/04014* (2016.01)
*H01M 8/04029* (2016.01)

(52) U.S. Cl.
CPC ... *H01M 8/04134* (2013.01); *H01M 8/04014* (2013.01); *H01M 8/04029* (2013.01); *H01M 8/04067* (2013.01)

(58) Field of Classification Search
CPC ......... H01M 8/04134; H01M 8/04067; H01M 8/04014; H01M 8/04029
See application file for complete search history.

(56) References Cited

FOREIGN PATENT DOCUMENTS

JP         2013239290 A     11/2013

*Primary Examiner* — Sarah A. Slifka
(74) *Attorney, Agent, or Firm* — Lempia Summerfield Katz LLC

(57) ABSTRACT

An air cooler includes: a cooler main body having a first zone and a second zone partitioned off from the first zone; cooling flow paths configured to cool the air and disposed in the first zone so that the air introduced into the cooler main body passes therethrough; bypass flow paths configured to allow the air to bypass the cooling flow paths and disposed in the second zone so that the air introduced into the cooler main body passes therethrough; and an opening/closing unit configured to selectively open or close the cooling flow paths, thereby obtaining an advantageous effect of simplifying a structure thereof and optimizing water balance of a fuel cell stack.

17 Claims, 13 Drawing Sheets

AIR COOLER AND FUEL CELL SYSTEM

CROSS-REFERENCE TO RELATED APPLICATION

This application claims priority to and the benefit of Korean Patent Application No. 10-2021-0129213, filed in the Korean Intellectual Property Office on Sep. 29, 2021, the entire contents of which are incorporated herein by reference.

TECHNICAL FIELD

The present disclosure relates to an air cooler and a fuel cell system, and more particularly, to an air cooler and a fuel cell system capable of simplifying a structure thereof and optimizing water balance of a fuel cell stack.

BACKGROUND ART

The statements in this section merely provide background information related to the present disclosure and may not constitute prior art.

A fuel cell vehicle (e.g., a hydrogen fuel cell vehicle) is configured to generate electricity by means of a chemical reaction between fuel (hydrogen) and air (oxygen) and travel by operating a motor.

In general, the fuel cell vehicle may include a fuel cell stack configured to generate electricity by means of an oxidation-reduction reaction between hydrogen and oxygen, a fuel supply device configured to supply fuel (hydrogen) to the fuel cell stack, an air supply device configured to supply the fuel cell stack with air (oxygen) which is an oxidant required for an electrochemical reaction, and a thermal management system (TMS) configured to discharge heat, which is generated from the fuel cell stack and power electronic parts of the vehicle, to the outside of the system and control temperatures of the fuel cell stack and the power electronic parts.

Meanwhile, in order for the fuel cell stack to normally operate, water balance of the fuel cell stack needs to be optimized depending on an operating condition of the fuel cell stack.

That is, if the amount of moisture (water) supplied into the fuel cell stack is larger than the amount of moisture (water) discharged from the fuel cell stack, flooding occurs in the fuel cell stack, which may degrade performance and operational efficiency of the fuel cell stack.

On the contrary, if the amount of moisture (water) supplied into the fuel cell stack is smaller than the amount of moisture (water) discharged from the fuel cell stack, the interior of the fuel cell stack becomes dry, which may degrade operational efficiency and performance of the fuel cell stack. Therefore, the water balance of the fuel cell stack needs to be optimized depending on the operating condition of the fuel cell stack.

As a method of adjusting the water balance of the fuel cell stack, there has been proposed a method of adjusting a temperature of air to be supplied to a humidifier (which humidifies air to be supplied to the fuel cell stack) depending on the operating condition of the fuel cell stack using an air cooler provided at an upstream side of the humidifier.

However, we have discovered that in the related art, a separate bypass tube is provided outside the air cooler, and the water balance of the fuel cell stack is adjusted by allowing the air to exchange heat (be cooled) in the air cooler and then be supplied to the humidifier or by allowing the air to be supplied directly to the humidifier through the bypass tube outside the air cooler without passing through the air cooler. For this reason, there are problems in that the structure is complicated, a degree of design freedom and spatial utilization deteriorate, and it is difficult to accurately adjust the water balance of the fuel cell stack depending on the operating condition of the fuel cell stack.

Therefore, recently, various types of studies have been conducted to simplify the structure while optimizing the water balance of the fuel cell stack depending on the operating condition of the fuel cell stack, but the study results are still insufficient.

SUMMARY

The present disclosure provides an air cooler and a fuel cell system capable of simplifying a structure thereof and optimizing water balance of a fuel cell stack.

In particular, the present disclosure adjusts water balance of a fuel cell stack by selectively changing an area for heat exchange between an air cooler and air depending on an operating condition of the fuel cell stack.

The present disclosure also reduces or minimizes an increase in differential pressure of air to be supplied to a humidifier and improve energy efficiency.

The present disclosure accurately adjusts water balance of a fuel cell stack depending on an operating condition of the fuel cell stack.

The present disclosure may simplify a structure and improve a degree of design freedom and spatial utilization.

The present disclosure also adjusts water balance of a fuel cell stack depending on an operating condition of the fuel cell stack without providing a separate bypass flow path outside an air cooler.

The present disclosure improves responsiveness in adjusting a temperature of air, stability, and reliability.

The objects to be achieved by the embodiments are not limited to the above-mentioned objects, but also include objects or effects that may be understood from the solutions or embodiments described below.

An embodiment of the present disclosure provides an air cooler including: a cooler main body having a first zone and a second zone partitioned off from the first zone; cooling flow paths configured to cool the air and disposed in the first zone so that the air introduced into the cooler main body passes therethrough; bypass flow paths configured to allow the air to bypass the cooling flow paths and disposed in the second zone so that the air introduced into the cooler main body passes therethrough; and an opening/closing unit configured to selectively open or close the cooling flow paths.

This is to simplify a structure for adjusting water balance of a fuel cell stack and accurately adjust the water balance of the fuel cell stack depending on an operating condition of the fuel cell stack.

That is, in the related art, a separate bypass tube is provided outside the air cooler, and the water balance of the fuel cell stack is adjusted by allowing the air to exchange heat (be cooled) in the air cooler and then be supplied to the humidifier or by allowing the air to be supplied directly to the humidifier through the bypass tube outside the air cooler without passing through the air cooler. For this reason, there are problems in that the structure is complicated, a degree of design freedom and spatial utilization deteriorate, and it is difficult to accurately adjust the water balance of the fuel cell stack depending on the operating condition of the fuel cell stack.

In contrast, according to the embodiment of the present disclosure, the cooling flow path of the air cooler for cooling the air may be selectively opened or closed, and the amount of humidification of the air may be adjusted by changing a degree of cooling the air (a temperature of the air) to be supplied to a humidifier. Therefore, it is possible to accurately adjust the water balance of the fuel cell stack depending on the operating condition of the fuel cell stack.

In addition, according to the embodiment of the present disclosure, the bypass flow path disposed in the air cooler may allow the air to bypass the cooling flow path, and thus a separate bypass tube for allowing the air to bypass the cooling flow path need not be provided outside the air cooler. Therefore, it is possible to obtain an advantageous effect of simplifying the structure and improving the degree of design freedom and spatial utilization.

Moreover, according to the embodiment of the present disclosure, the air, which is not cooled (does not exchange heat) in the air cooler, need not pass through the bypass tube having a complicated structure (e.g., a tube bent in a curved shape). Therefore, it is possible to reduce or minimize the increase in differential pressure of the air to be supplied to the humidifier and improve energy efficiency.

According to the exemplary embodiment of the present disclosure, the air cooler may include: a first tube member disposed in the first zone and configured to circulate a coolant that exchanges heat with the air; and a second tube member which is disposed in the first zone, spaced apart from the first tube member, and configured to circulate the coolant. In one form, the cooling flow path may be defined between the first tube member and the second tube member.

According to the exemplary embodiment of the present disclosure, the air cooler may include heat exchange fins disposed on an outer surface of the first tube member and an outer surface of the second tube member and configured to exchange heat with the air passing through the cooling flow path.

According to the exemplary embodiment of the present disclosure, the air cooler may include: a first bypass tube member disposed in the second zone; and a second bypass tube member disposed in the second zone and spaced apart from the first bypass tube member, and the bypass flow path may be defined between the first bypass tube member and the second bypass tube member.

According to the exemplary embodiment of the present disclosure, the air cooler may include bypass heat exchange fins disposed on an outer surface of the first bypass tube member and an outer surface of the second bypass tube member and configured to exchange heat with the air.

In particular, the bypass heat exchange fins may be disposed with a lower fin density per unit area than a fin density of the heat exchange fins.

For reference, in the embodiment of the present disclosure, the configuration in which the opening/closing unit selectively opens or closes the cooling flow path includes both a configuration in which the flow of air passing through the cooling flow path is turned on or off and a configuration in which a flow rate of the air passing through the cooling flow path is adjusted.

The opening/closing unit may have various structures capable of selectively opening or closing the cooling flow path.

For example, the opening/closing unit may include: a valve member disposed in the cooler main body so as to be movable from a first position at which the cooling flow path is opened to a second position at which the cooling flow path is closed; a driving source configured to provide driving power for moving the valve member from the first position to the second position; and a power transmission part configured to transmit the driving power of the driving source to the valve member.

The valve member may be configured to move from the first position to the second position in various ways in accordance with required conditions and design specifications. For example, the valve member may rectilinearly move from the first position to the second position (or from the second position to the first position).

The power transmission part may be variously changed in structure in accordance with required conditions and design specifications.

For example, the power transmission part may include: a pinion gear configured to be rotated by the driving source; and a rack gear connected to the valve member and configured to engage with the pinion gear and convert a rotation of the pinion gear into a rectilinear movement of the valve member.

According to the exemplary embodiment of the present disclosure, the air cooler may include an air guide disposed in the cooler main body. The air guide is positioned at the downstream side from the cooling flow path and the bypass flow path, and configured to mix the air having passed through the cooling flow path and the air having passed through the bypass flow path.

As described above, the air guide may be disposed at the downstream side from the cooling flow path and the bypass flow path and mix the air having passed through the cooling flow path and the air having passed through the bypass flow path. Therefore, the temperature of the air to be supplied to the humidifier may be uniformly maintained, which makes it possible to more accurately control the degree of humidification of the air.

The air guide may have various structures capable of mixing the air having passed through the cooling flow path and the air having passed through the bypass flow path.

For example, the air guide may include: a first guide member disposed in the cooler main body and having a first inclined guide surface facing the bypass flow path; and a second guide member disposed in the cooler main body, facing the first guide member, and having a second inclined guide surface facing the cooling flow path.

According to the exemplary embodiment of the present disclosure, the air cooler may include a variable valve disposed in the bypass flow path and configured to selectively change an air passage area of the bypass flow path.

As described above, the variable valve may be disposed in the bypass flow path and selectively change the air passage area of the bypass flow path, which makes it possible to adjust the flow rate of the air passing through the bypass flow path.

Therefore, a ratio of the air having passed through the bypass flow path to the air having passed through the cooling flow path (a ratio of non-cooled air to cooled air) may be selectively adjusted depending on the operating condition of the fuel cell stack. Therefore, it is possible to more accurately adjust the water balance of the fuel cell stack.

According to the exemplary embodiment of the present disclosure, the air cooler may include a shutter part disposed at an inlet end of the cooling flow path so as to be movable from a first position at which the cooling flow path is opened to a second position at which the cooling flow path is closed.

The shutter part may have various structures capable of opening or closing the inlet end of the cooling flow path.

For example, the shutter part may include a first shutter member configured to rotate from the first position to the second position, and a second shutter member disposed separately from the first shutter member and configured to rotate from the first position to the second position.

According to the exemplary embodiment of the present disclosure, the cooling flow paths may include first flow paths configured to cool the air, and second flow paths partitioned off from the first flow paths and configured to cool the air separately from the first flow paths. The first shutter member may selectively open or close the first flow paths, and the second shutter member may selectively open or close the second flow paths independently of the first shutter member.

As described above, the cooling flow paths may be partitioned into the first flow paths and the second flow paths, and the plurality of flow paths (the first flow paths and the second flow paths) may be individually opened or closed by the first and second shutter members. Therefore, the different heat exchange performances (performances in cooling the air) may be implemented by the first and second flow paths. Therefore, only any one of the first flow path and the second flow path may be selectively opened or closed under a condition in which the water balance of the fuel cell stack may be optimized depending on the operating condition of the fuel cell stack.

In another embodiment of the present disclosure, a fuel cell system includes: a fuel cell stack; a humidifier configured to humidify air to be supplied to the fuel cell stack; and an air cooler configured to selectively cool the air to be supplied to the humidifier. The air cooler includes: a cooler main body having a first zone and a second zone partitioned off from the first zone; cooling flow paths configured to cool the air and disposed in the first zone so that the air introduced into the cooler main body passes therethrough; bypass flow paths configured to allow the air to bypass the cooling flow paths and disposed in the second zone so that the air introduced into the cooler main body passes therethrough; and an opening/closing unit configured to selectively open or close the cooling flow paths.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

In order that the disclosure may be well understood, there will now be described various forms thereof, given by way of example, reference being made to the accompanying drawings, in which.

Figure 1:
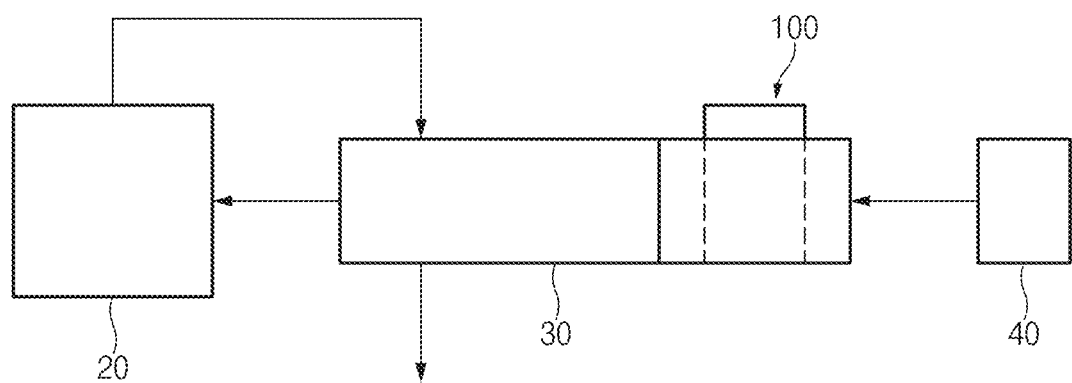
FIG. 1 is a view for explaining a fuel cell system according to an embodiment of the present disclosure.
Figure 2:
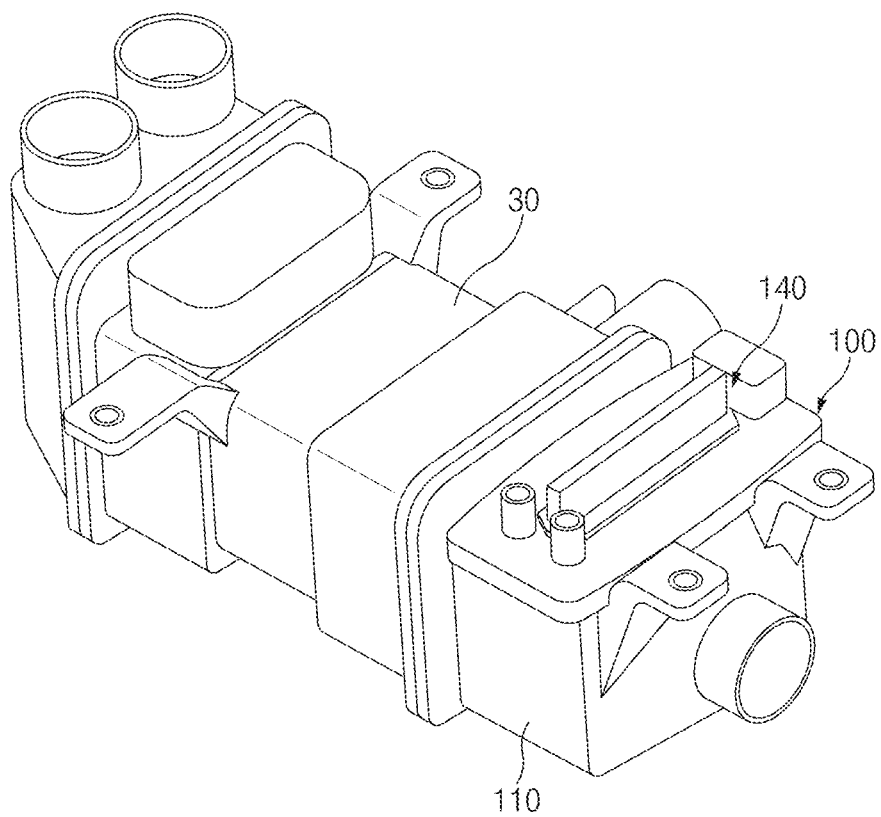
FIGS. 2 and 3 are views for explaining an air cooler of the fuel cell system according to one embodiment of the present disclosure.
Figure 3:
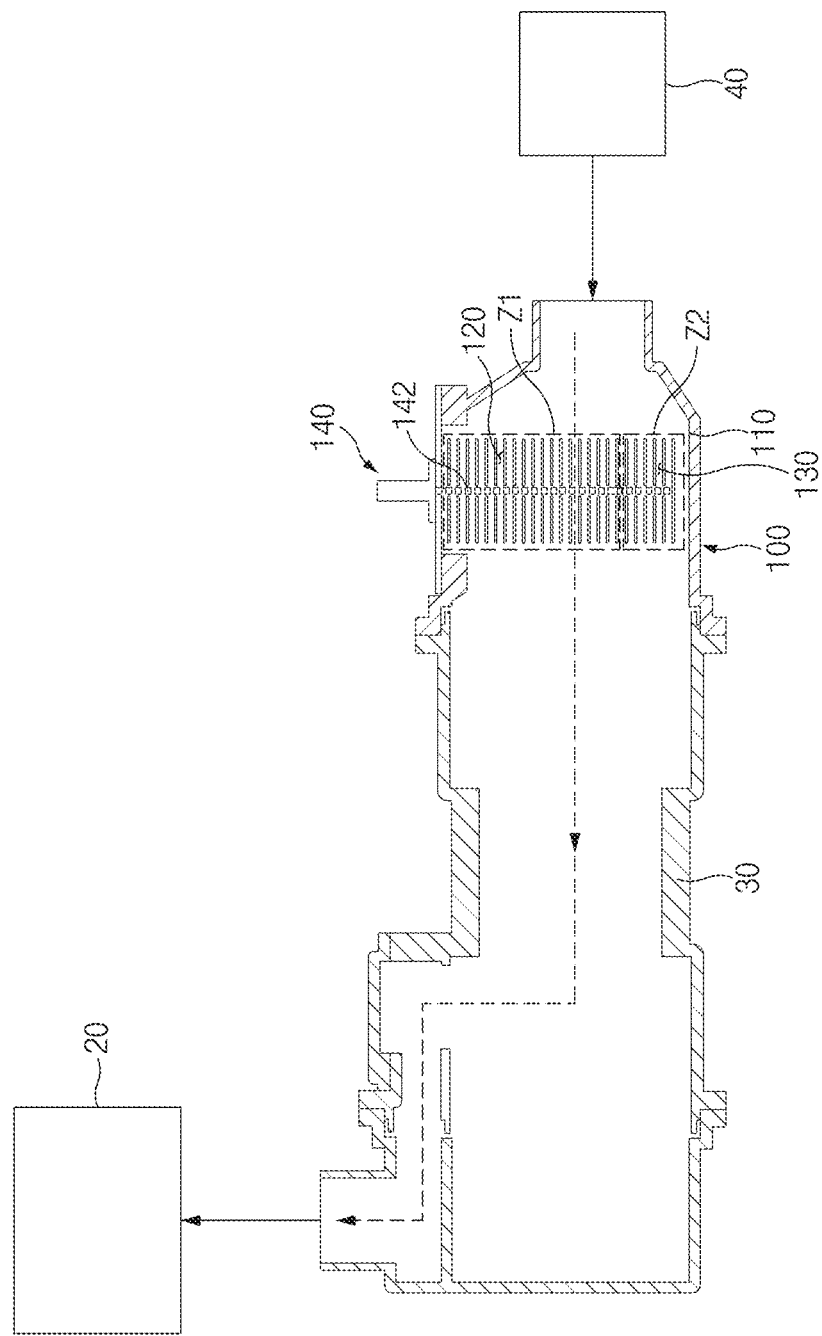
Figure 4:
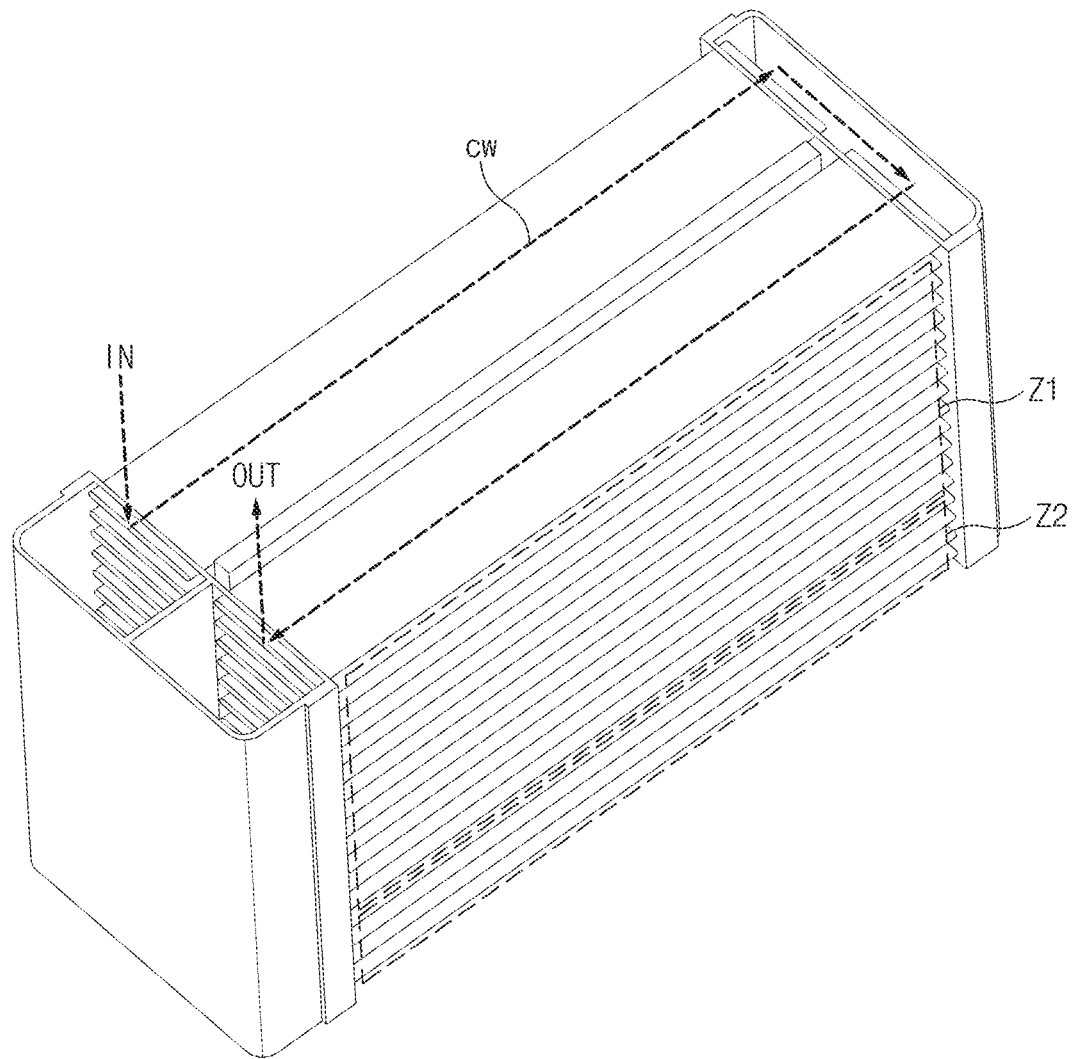
FIG. 4 is a view for explaining a first zone and a second zone of the fuel cell system according to an embodiment of the present disclosure.
Figure 5:
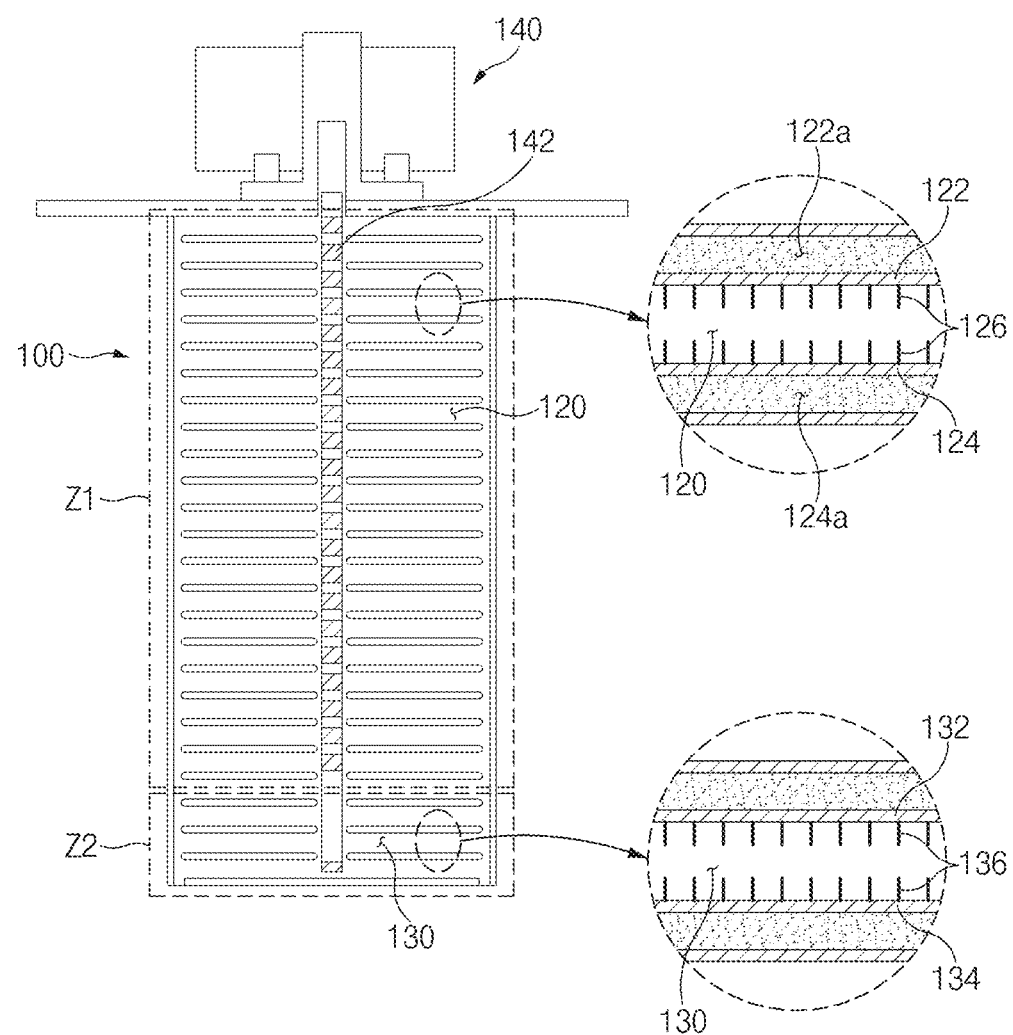
FIG. 5 is a view for explaining a cooling flow path and a bypass flow path of the fuel cell system according to one embodiment of the present disclosure.

The drawings described herein are for illustration purposes only and are not intended to limit the scope of the present disclosure in any way.

DETAILED DESCRIPTION

Hereinafter, exemplary embodiments of the present disclosure are described in detail with reference to the accompanying drawings.

However, the technical spirit of the present disclosure is not limited to some embodiments described herein but may be implemented in various different forms. One or more of the constituent elements in the embodiments may be selectively combined and substituted for use within the scope of the technical spirit of the present disclosure.

In addition, unless otherwise specifically and explicitly defined and stated, the terms (including technical and scientific terms) used in the embodiments of the present disclosure may be construed as the meaning which may be commonly understood by the person with ordinary skill in the art to which the present disclosure pertains. The meanings of the commonly used terms such as the terms defined in dictionaries may be interpreted in consideration of the contextual meanings of the related technology.

In addition, the terms used in the embodiments of the present disclosure are for explaining the embodiments, not for limiting the present disclosure.

In the present specification, unless particularly stated otherwise, a singular form may also include a plural form. The expression "at least one (or one or more) of A, B, or C" may include one or more of all combinations that can be made by combining A, B, and C.

In addition, the terms such as first, second, A, B, (a), and (b) may be used to describe constituent elements of the embodiments of the present disclosure.

These terms are used only for the purpose of discriminating one constituent element from another constituent element, and the nature, the sequences, or the orders of the constituent elements are not limited by the terms.

Further, when one constituent element is described as being 'connected', 'coupled', or 'attached' to another constituent element, one constituent element may be connected, coupled, or attached directly to another constituent element or connected, coupled, or attached to another constituent element through still another constituent element interposed therebetween.

When a component, device, element, or the like of the present disclosure is described as having a purpose or performing an operation, function, or the like, the component, device, or element should be considered herein as being "configured to" meet that purpose or to perform that operation or function.

In addition, the expression "one constituent element is provided or disposed above (on) or below (under) another constituent element" includes not only a case in which the two constituent elements are in direct contact with each other, but also a case in which one or more other constituent elements are provided or disposed between the two constituent elements. The expression "above (on) or below (under)" may mean a downward direction as well as an upward direction based on one constituent element.

Referring to FIGS. 1 to 13, an air cooler 100 according to embodiments of the present disclosure includes: a cooler main body 110 having a first zone Z1 and a second zone Z2 partitioned off from the first zone Z1, cooling flow paths 120 configured to cool the air and disposed in the first zone Z1 so that the air introduced into the cooler main body 110 may pass therethrough; bypass flow paths 130 configured to allow the air to bypass the cooling flow paths 120 and disposed in the second zone Z2 so that the air introduced into the cooler main body 110 may pass therethrough; and an opening/closing unit 140 configured to selectively open or close the cooling flow paths 120.

In one embodiment, the air cooler 100 may be used to selectively cool the air to be supplied to a subject. The present disclosure is not restricted or limited by the type and properties of the subject to which the air cooler 100 is applied.

In another embodiment, the air cooler 100 is applied to a fuel cell system 10 applied to mobility vehicles such as automobiles, ships, and airplanes.

According to the exemplary embodiment of the present disclosure, the fuel cell system 10 includes: a fuel cell stack 20, a humidifier 30 configured to humidify the air to be supplied to the fuel cell stack 20, and the air cooler 100 configured to selectively cool the air to be supplied to the humidifier 30. The air cooler 100 includes: the cooler main body 110 having the first zone Z1 and the second zone Z2 partitioned off from the first zone Z1, the cooling flow paths 120 configured to cool the air and disposed in the first zone Z1 so that the air introduced into the cooler main body 110 may pass therethrough; the bypass flow paths 130 configured to allow the air to bypass the cooling flow paths 120 and disposed in the second zone Z2 so that the air introduced into the cooler main body 110 may pass therethrough; and the opening/closing unit 140 configured to selectively open or close the cooling flow paths 120.

For reference, the fuel cell stack 20 refers to a kind of power generation device that generates electrical energy through a chemical reaction of fuel (e.g., hydrogen), and the fuel cell stack may be configured by stacking several tens or hundreds of fuel cells (unit cells) in series.

The fuel cell may have various structures capable of producing electricity by means of an oxidation-reduction reaction between fuel (e.g., hydrogen) and an oxidant (e.g., air).

For example, the fuel cell may include: a membrane electrode assembly (MEA) (not illustrated) having catalyst electrode layers in which electrochemical reactions occur and which is attached to two opposite sides of an electrolyte membrane through which hydrogen ions move; a gas diffusion layer (GDL) (not illustrated) configured to uniformly distribute reactant gases and transfer generated electrical energy; a gasket (not illustrated) and a fastener (not illustrated) configured to maintain leakproof sealability for the reactant gases and a coolant and maintain an appropriate fastening pressure; and a separator (bipolar plate) (not illustrated) configured to move the reactant gases and the coolant.

More specifically, in the fuel cell, hydrogen, which is fuel, and air (oxygen), which is an oxidant, are supplied to an anode and a cathode of the membrane electrode assembly, respectively, through flow paths in the separator, such that the hydrogen is supplied to the anode, and the air is supplied to the cathode.

The hydrogen supplied to the anode is decomposed into hydrogen ions (protons) and electrons by catalysts in the electrode layers provided at two opposite sides of the electrolyte membrane. Only the hydrogen ions are selectively transmitted to the cathode through the electrolyte membrane, which is a cation exchange membrane, and at the same time, the electrons are transmitted to the cathode through the gas diffusion layer and the separator which are conductors.

At the cathode, the hydrogen ions supplied through the electrolyte membrane and the electrons transmitted through the separator meet oxygen in the air supplied to the cathode by an air supply device, thereby creating a reaction of producing water. As a result of the movement of the hydrogen ions, the electrons flow through external conductive wires, and the electric current is generated as a result of the flow of the electrons.

Meanwhile, the electrolyte membrane of the membrane electrode assembly needs to be maintained at a predetermined humidity or higher so that the fuel cell stack 20 normally operates.

To this end, the air to be supplied to the fuel cell stack 20 along an air supply line (not illustrated) may pass through the humidifier 30, and the air supplied along the air supply line may be humidified while passing through the humidifier 30. In this case, the humidification of air is defined as a process of increasing the humidity of the air.

For example, the humidifier 30 may be configured to humidify air (dry air) to be supplied to the fuel cell stack 20 using air (moist air) discharged from the fuel cell stack 20.

The humidifier 30 may have various structures capable of humidifying the dry air using the air (moist air) discharged from the fuel cell stack 20. The present disclosure is not restricted or limited by the structure of the humidifier 30.

According to the exemplary embodiment of the present disclosure, the humidifier 30 is disposed between an air compressor 40 and the fuel cell stack 20. The humidifier 30 may include an inflow gas supply port (not illustrated) through which inflow gas (dry air) is introduced (supplied), an inflow gas discharge port (not illustrated) through which the (humidified) inflow gas having passed through the interior of the humidifier 30 is discharged, a moist air supply port (not illustrated) through which moist air discharged from the fuel cell stack 20 is supplied, and a moist air discharge port (not illustrated) through which the moist air, which has humidified the inflow gas, is discharged to the outside.

The inflow gas supplied through the inflow gas supply port may be humidified by the moist air while passing through a humidification membrane (e.g., a hollow fiber membrane) (not illustrated) disposed in the humidifier 30. Then, the humidified inflow gas may be supplied to the fuel cell stack 20 through the inflow gas discharge port.

Further, the moist air (or the condensate water) discharged from the fuel cell stack 20 may be supplied to the moist air supply port, humidify the inflow gas in the humidifier 30, and then be discharged to the outside through the moist air discharge port.

Referring to FIGS. 1 to 6, the air cooler 100 selectively cools the air to be supplied to the fuel cell stack 20.

That is, the air is supplied to the fuel cell stack 20 in a state of being compressed by the air compressor 40 so that the air may have a sufficient pressure that enables the air to pass through an inner flow path of the fuel cell stack 20. The process of compressing the air generates heat, and the fuel cell stack 20 may be overheated when a temperature of the air to be supplied to the fuel cell stack 20 is raised to a certain level or higher, which may cause a deterioration in performance of the fuel cell stack 20. Therefore, the air compressed by the air compressor 40 may be cooled by the air cooler 100 before the air is supplied to the fuel cell stack 20.

Further, the air cooler 100 may adjust the amount of humidification (humidity) of the air passing through the humidifier 30 by adjusting a degree of cooling the air (a temperature of the air) to be supplied to the humidifier 30.

This is based on the fact that the amount of humidification (degree of humidification) of the air humidified by the humidifier 30 varies depending on the temperature of the air supplied to the humidifier 30.

For example, the humidity of the air passing through the humidifier 30 may increase as the temperature of the air to be supplied to the humidifier 30 is lowered. On the contrary, the humidity of the air passing through the humidifier 30 may decrease as the temperature of the air to be supplied to the humidifier 30 is raised.

For example, the air cooler 100 may be disposed in the humidifier 30, and the air introduced into the inflow gas supply port may be supplied to the fuel cell stack 20 via the air cooler 100. According to another embodiment of the present disclosure, the air cooler may be separately disposed outside the humidifier.

More specifically, the air cooler 100 includes the cooler main body 110, the cooling flow path 120, the bypass flow path 130, and the opening/closing unit 140.

The cooler main body 110 may have various structures each having a predetermined space therein. The present disclosure is not restricted or limited by the structure and shape of the cooler main body 110. For example, the cooler main body 110 may be provided in the form of an approximately quadrangular box.

An internal space of the cooler main body 110 may be partitioned into the first zone Z1 and the second zone Z2.

In this case, the configuration in which the internal space of the cooler main body 110 is partitioned into the first zone Z1 and the second zone Z2 means that the first zone Z1 and the second zone Z2 are spatially separated from each other and the flow of air between the first zone Z1 and the second zone Z2 is blocked. For example, the first zone Z1 and the second zone Z2 may be partitioned by a tube member or a partition wall (not illustrated).

The first and second zones Z1 and Z2 of the cooler main body 110 may have various sizes and be disposed at various positions in accordance with required conditions and design specifications. The present disclosure is not restricted or limited by the positions and sizes of the first and second zones Z1 and Z2.

For example, an upper space of the cooler main body 110 may be defined as the first zone Z1, and a lower space of the cooler main body 110 may be defined as the second zone Z2. In this case, the second zone Z2 may have a smaller size (e.g., volume) than the first zone Z1.

The cooling flow path 120 is disposed in the first zone Z1 so that the air introduced into the cooler main body 110 may pass therethrough. The cooling flow path 120 cools the air passing through the first zone Z1.

The cooling flow path 120 may have various structures capable of cooling the air. The present disclosure is not restricted or limited by the structure of the cooling flow path 120.

For example, the air cooler 100 may include: first tube members 122 disposed in the first zone Z1 and configured to circulate a coolant that exchanges heat with the air; and second tube members 124 disposed in the first zone Z1, spaced apart from (e.g., disposed above or below) the first tube members 122, and configured to circulate the coolant. The cooling flow path 120 may be defined between the first tube member 122 and the second tube member 124.

For example, the first tube member 122 may be provided in the form of a flat tube having a straight shape, and a first coolant flow path 122a along which the coolant (e.g., water) circulates may be defined in the first tube member 122. Likewise, the second tube member 124 may be provided in the form of a flat tube having a straight shape, and a second coolant flow path 124a along which the coolant (e.g., water) circulates may be defined in the second tube member 124. The cooling flow path may be defined between an outer surface of the first tube member 122 and an outer surface of the second tube member 124.

The first and second tube members 122 and 124 may be repeatedly disposed in an upward/downward direction. One end of each of the first and second tube members 122 and 124 may communicate with an inlet manifold (not illustrated) into which the coolant (see CW in FIG. 4) is introduced. The other end of each of the first and second tube members 122 and 124 may communicate with an outlet manifold (not illustrated) from which the coolant CW is discharged. For example, the plurality of tube members may collectively define a continuous coolant flow path having an approximately 'U' shape.

In one embodiment, the coolant passing through the interior (first zone) of the cooler main body 110 may pass through the power electronic parts that uses electric power of the vehicle as an energy source.

The cooling flow path may be defined between the adjacent tube members (e.g., the first tube member and the second tube member). The cooling flow path may be variously changed in number and height (height in the upward/downward direction based on FIG. 5) in accordance with required conditions and design specifications.

According to one embodiment of the present disclosure, the cooling flow path has a straight shape. However, according to another embodiment of the present disclosure, the cooling flow path may have a curved shape or other shapes.

According to the exemplary embodiment of the present disclosure, the fuel cell system 10 may include: heat exchange fins 126 disposed on an outer surface of the first tube member 122 and an outer surface of the second tube member 124 and configured to exchange heat with the air passing through the cooling flow path 120.

The heat exchange fin 126 may have various structures capable of being exposed to the air passing through the cooling flow path 120. The present disclosure is not restricted or limited by the type and structure of the heat exchange fin 126.

For example, the heat exchange fin 126 may be provided in the form of an approximately straight plate. The plurality of heat exchange fins 126 may be disposed to be spaced apart from one another along the outer surface of the first tube member 122 and the outer surface of the second tube member 124.

Because the heat exchange fins 126 are disposed on the outer surface of the first tube member 122 and the outer surface of the second tube member 124 as described above, it is possible to further improve the efficiency of heat exchange between the air passing through the cooling flow path and the coolant circulating in the first and second tube members 122 and 124 (the effect of cooling the air).

According to another embodiment of the present disclosure, heat exchange members (e.g., rectangular fins) each having a quadrangular cross-sectional shape, heat exchange members (e.g., triangular fins) each having a triangular cross-sectional shape, and heat exchange members (e.g., wavy fins) each having a wavy bent shape may be used as the heat exchange fins. Alternatively, heat exchange members (e.g., offset strip fins) each having a strip shape, heat exchange members (e.g., perforated fins) each having a plurality of holes, and heat exchange members (e.g., louvered fins) each having a plurality of louvers may be used as the heat exchange fins.

The bypass flow path 130 is disposed in the second zone Z2 and allows the air introduced into the cooler main body 110 to bypass the cooling flow path.

In this case, the configuration in which the air introduced into the cooler main body 110 bypasses the cooling flow path means that the air introduced into the cooler main body 110 is discharged directly to the outside of the cooler main body 110 along the bypass flow path 130 without being cooled (without passing through the cooling flow path).

The bypass flow path 130 may have various structures capable of allowing the air to bypass the cooling flow path. The present disclosure is not restricted or limited by the structure of the bypass flow path 130.

For example, the air cooler 100 may include first bypass tube members 132 disposed in the second zone Z2, and second bypass tube members 134 disposed in the second zone Z2 and spaced apart from the first bypass tube members 132. The bypass flow path 130 may be defined between the first bypass tube member 132 and the second bypass tube member 134.

For example, the first bypass tube member 132 may be provided in the form of a flat tube having a straight shape, and a coolant flow path (not illustrated) along which the coolant (e.g., water) circulates may be formed in the first bypass tube member 132. Likewise, the second bypass tube member 134 may be provided in the form of a flat tube having a straight shape, and a coolant flow path (not illustrated) along which the coolant (e.g., water) circulates may be formed in the second bypass tube member 134. The bypass flow path 130 may be defined between an outer surface of the first bypass tube member 132 and an outer surface of the second bypass tube member 134.

The first and second bypass tube members 132 and 134 may be repeatedly disposed in the upward/downward direction. One end of each of the first and second bypass tube members 132 and 134 may communicate with the inlet manifold (not illustrated) into which the coolant is introduced. The other end of each of the first and second bypass tube members 132 and 134 may communicate with the outlet manifold (not illustrated) from which the coolant is discharged. For example, the plurality of bypass tube members may collectively define a coolant flow path having an approximately 'U' shape.

The bypass flow path 130 may be defined between the adjacent bypass tube members (e.g., the first bypass tube member and the second bypass tube member). The bypass flow path 130 may be variously changed in number and height (height in the upward/downward direction based on FIG. 5) in accordance with required conditions and design specifications.

In one embodiment of the present disclosure, the bypass flow path 130 may have a straight shape. However, according to another embodiment of the present disclosure, the bypass flow path may have a curved shape or other shapes.

In one embodiment, the bypass flow path 130 may be kept opened at normal times. According to another embodiment of the present disclosure, the bypass flow path may be selectively opened or closed depending on an operating condition of the fuel cell stack.

According to one embodiment of the present disclosure, the fuel cell system 10 may include bypass heat exchange fins 136 disposed on an outer surface of the first bypass tube member 132 and an outer surface of the second bypass tube member 134 and configured to exchange heat with the air.

The bypass heat exchange fin 136 may have various structures capable of being exposed to the air passing through the bypass flow path 130. The present disclosure is not restricted or limited by the type and structure of the bypass heat exchange fin 136.

For example, the bypass heat exchange fin 136 may be provided in the form of an approximately straight plate. The plurality of bypass heat exchange fins 136 may be disposed to be spaced apart from one another along the outer surface of the first bypass tube member 132 and the outer surface of the second bypass tube member 134.

According to another embodiment of the present disclosure, heat exchange members (e.g., rectangular fins) each having a quadrangular cross-sectional shape, heat exchange members (e.g., triangular fins) each having a triangular cross-sectional shape, and heat exchange members (e.g., wavy fins) each having a wavy bent shape may be used as the bypass heat exchange fins. Alternatively, heat exchange members (e.g., offset strip fins) each having a strip shape, heat exchange members (e.g., perforated fins) each having a plurality of holes, and heat exchange members (e.g., louvered fins) each having a plurality of louvers may be used as the bypass heat exchange fins.

In particular, the bypass heat exchange fins 136 may be disposed with a lower fin density per unit area than a fin density of the heat exchange fins 126.

In this case, the configuration in which the bypass heat exchange fins 136 are disposed with a lower fin density per unit area than the fin density of the heat exchange fins 126 may mean that the number of bypass heat exchange fins 136 per unit area is smaller than the number of heat exchange fins 126 per unit area.

Because the bypass heat exchange fins 136 are disposed with a lower fin density per unit area than a fin density of the heat exchange fins 126 as described above, it is possible to increase the effect of cooling the air passing through the cooling flow path and decrease the effect of cooling (i.e., the heat exchange performance of) the air passing through the bypass flow path 130.

Meanwhile, in the embodiment of the present disclosure illustrated and described above, the bypass flow path 130 is defined by the first and second bypass tube members 132 and 134 disposed in the second zone Z2. However, according to another embodiment of the present disclosure, the bypass flow path may be directly defined in the cooler main body (second zone) without the first bypass tube member and the second bypass tube member.

In another embodiment, the bypass flow path may be defined by the first and second bypass tube members disposed in the second zone and have a structure in which the coolant does not circulate in the first and second bypass tube members (the interior of the first bypass tube member and the interior of the second bypass tube member are blocked).

The opening/closing unit 140 selectively opens or closes the cooling flow path 120.

In this case, the configuration in which the opening/closing unit 140 selectively opens or closes the cooling flow path 120 includes both a configuration in which the flow of air passing through the cooling flow path 120 is turned on or off and a configuration in which a flow rate of the air passing through the cooling flow path 120 is adjusted.

For example, the flow rate of the air passing through the cooling flow path 120 may be adjusted by changing a cross-sectional area of the cooling flow path 120 (an air passage area of the cooling flow path 120).

The opening/closing unit 140 may have various structures capable of selectively opening or closing the cooling flow path 120. The present disclosure is not restricted or limited by the structure of the opening/closing unit 140.

For example, the opening/closing unit 140 may include: a valve member 142 disposed in the cooler main body 110 and configured to be movable from a first position at which the cooling flow paths 120 are opened to a second position at which the cooling flow paths 120 are closed; a driving source 144 configured to provide driving power for moving the valve member 142 from the first position to the second position; and a power transmission part 146 configured to transmit the driving power of the driving source 144 to the valve member 142.

The valve member 142 may be configured to move from the first position to the second position in various ways in accordance with required conditions and design specifications.

For example, the valve member 142 may rectilinearly move from the first position to the second position (or from the second position to the first position). According to another embodiment of the present disclosure, the valve member may rotate from the first position to the second position.

For example, the valve member 142 may include a plurality of valve rods (not illustrated) having heights corresponding to the heights of the cooling flow paths 120 (the heights in the upward/downward direction based on FIG. 5), and the valve member 142 may open or close the cooling flow paths 120 while rectilinearly moving in the upward/downward direction from an approximately middle portion of the cooler main body 110 (a middle portion of the cooling flow path 120).

In particular, the valve member 142 may simultaneously open or close the plurality of cooling flow paths defined between the adjacent tube members (e.g., the first tube members and the second tube members). According to another embodiment of the present disclosure, the plurality of cooling flow paths defined between the adjacent tube members may be sequentially (or individually) opened or closed by the valve member.

Various drive means capable of providing driving power required to move the valve member 142 may be used as the driving source 144. The present disclosure is not restricted or limited by the type and structure of the driving source 144.

For example, a typical motor may be used as the driving source 144. According to another embodiment of the present disclosure, a pneumatic (or hydraulic) cylinder, a solenoid, or the like may be used as the driving source.

The power transmission part 146 is configured to transmit the driving power of the driving source 144 to the valve member 142. The power transmission part 146 may be variously changed in structure in accordance with required conditions and design specifications.

Figure 6:
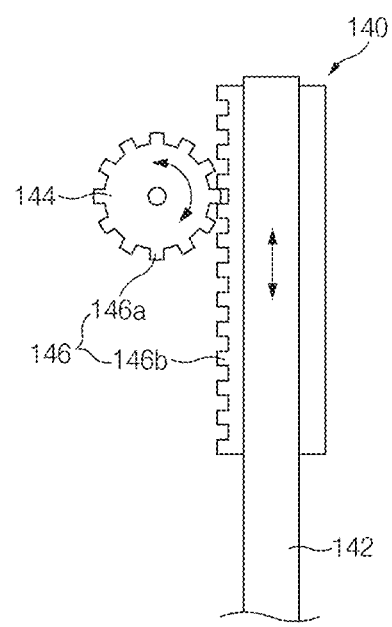
FIG. 6 is a view for explaining an opening/closing unit of the fuel cell system according to one embodiment of the present disclosure.

For example, referring to FIG. 6, the power transmission part 146 may include a pinion gear 146a configured to be rotated by the driving source 144, and a rack gear 146b connected to the valve member 142 and configured to engage with the pinion gear 146a and convert a rotation of the pinion gear 146a into a rectilinear movement of the valve member 142. Alternatively, other gears may be combined to constitute the power transmission part.

According to another embodiment of the present disclosure, a lead screw or other typical linear motion systems may be used to move the valve member.

With this configuration, the degree of cooling the air (the temperature of the air) to be supplied to the humidifier 30 is adjusted by selectively opening or closing the cooling flow paths 120, which makes it possible to accurately adjust the water balance of the fuel cell stack 20 depending on the operating condition of the fuel cell stack 20.

For example, in a low-output operation mode of the fuel cell stack 20, the amount of moisture (water) supplied to the fuel cell stack 20 becomes larger than the amount of moisture (water) discharged from the fuel cell stack 20, which may cause flooding in the fuel cell stack 20.

Figure 7:
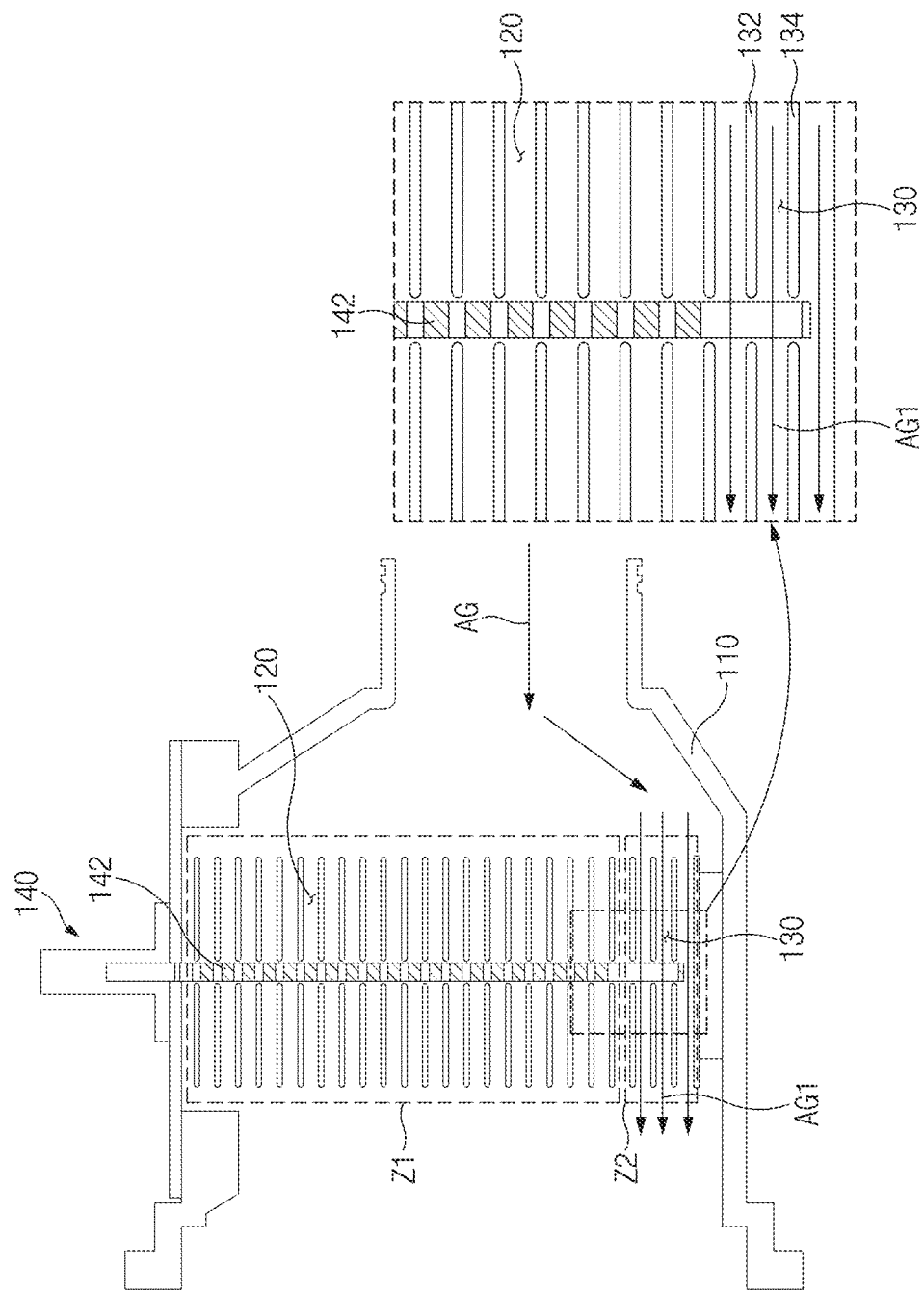
FIGS. 7 and 8 are views for explaining a flow of air in the fuel cell system according to one embodiment of the present disclosure.

Referring to FIG. 7, in the low-output operation mode of the fuel cell stack 20, the cooling flow path 120 may be completely closed by the valve member 142, and only the bypass flow path 130 may be kept opened.

Because the cooling flow path 120 is closed in the low-output operation mode of the fuel cell stack 20 as described above, air AG introduced into the cooler main body 110 may flow only through the bypass flow path 130, and air AG1 having passed through the bypass flow path 130 may be kept in a comparatively high temperature state without being cooled.

Therefore, the air AG1 to be supplied to the humidifier 30 via the air cooler 100 may be kept in a high temperature state (e.g., at a temperature similar to a temperature of the air to be supplied to the air cooler from the air compressor). Therefore, the humidity of the air having passed through the humidifier 30 may decrease, and the amount of moisture of the air finally supplied to the fuel cell stack 20 may be kept small.

In contrast, in a high-output operation mode (or middle output operation mode) of the fuel cell stack 20, the amount of moisture (water) discharged from the fuel cell stack 20 becomes larger than the amount of moisture (water) supplied to the fuel cell stack 20, such that the interior of the fuel cell stack 20 may become dry.

Figure 8:
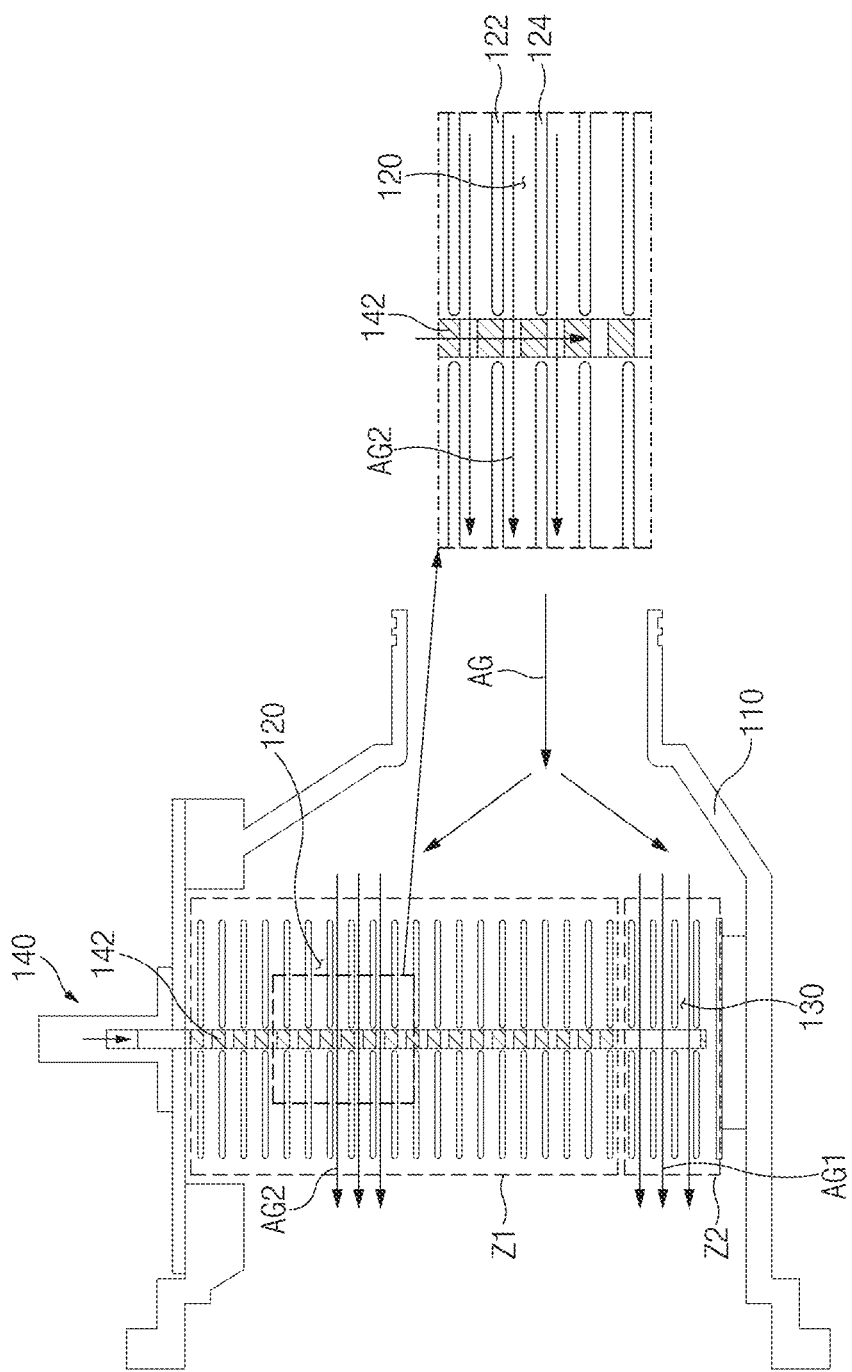

Referring to FIG. 8, in the high-output operation mode of the fuel cell stack 20, at least a part of the cooling flow path 120 may be opened (or the cooling flow path 120 may be fully opened) in the state in which the bypass flow path 130 is opened.

More specifically, when the rack gear 146b is moved downward by the driving power of the driving source 144, the valve member 142 connected to the rack gear 146b may move downward, such that at least a part of the cooling flow path 120 is opened (or the cooling flow path 120 is fully opened).

Because the cooling flow path 120 is opened in the high-output operation mode of the fuel cell stack 20 as described above, a part AG2 of the air AG introduced into the cooler main body 110 may pass through the cooling flow path, and the air AG2 having passed through the cooling flow path may be cooled by exchanging heat with the coolant. Further, another part AG1 of the air AG introduced into the cooler main body 110 may flow through the bypass flow path 130 in the state in which the cooling flow path 120 is opened.

Therefore, the air AG1 and AG2 to be supplied to the humidifier 30 via the air cooler 100 may be kept in a comparatively low-temperature state (cooled state), and the humidity of the air having passed through the humidifier 30 may increase, which makes it possible to maintain a large amount of moisture in the air finally supplied to the fuel cell stack 20.

In one embodiment, in the high-output operation mode in the fuel cell stack 20, the flow rate of the air passing through the cooling flow path 120 may be adjusted by changing an opening degree of the cooling flow path 120 (changing the air passage area of the cooling flow path 120). The temperature of the air having passed through the air cooler 100 (the temperature of the air to be supplied to the humidifier 30) may be more accurately adjusted depending on the operating condition of the fuel cell stack 20 by adjusting the flow rate of the air passing through the cooling flow path 120 as described above.

Figure 9:
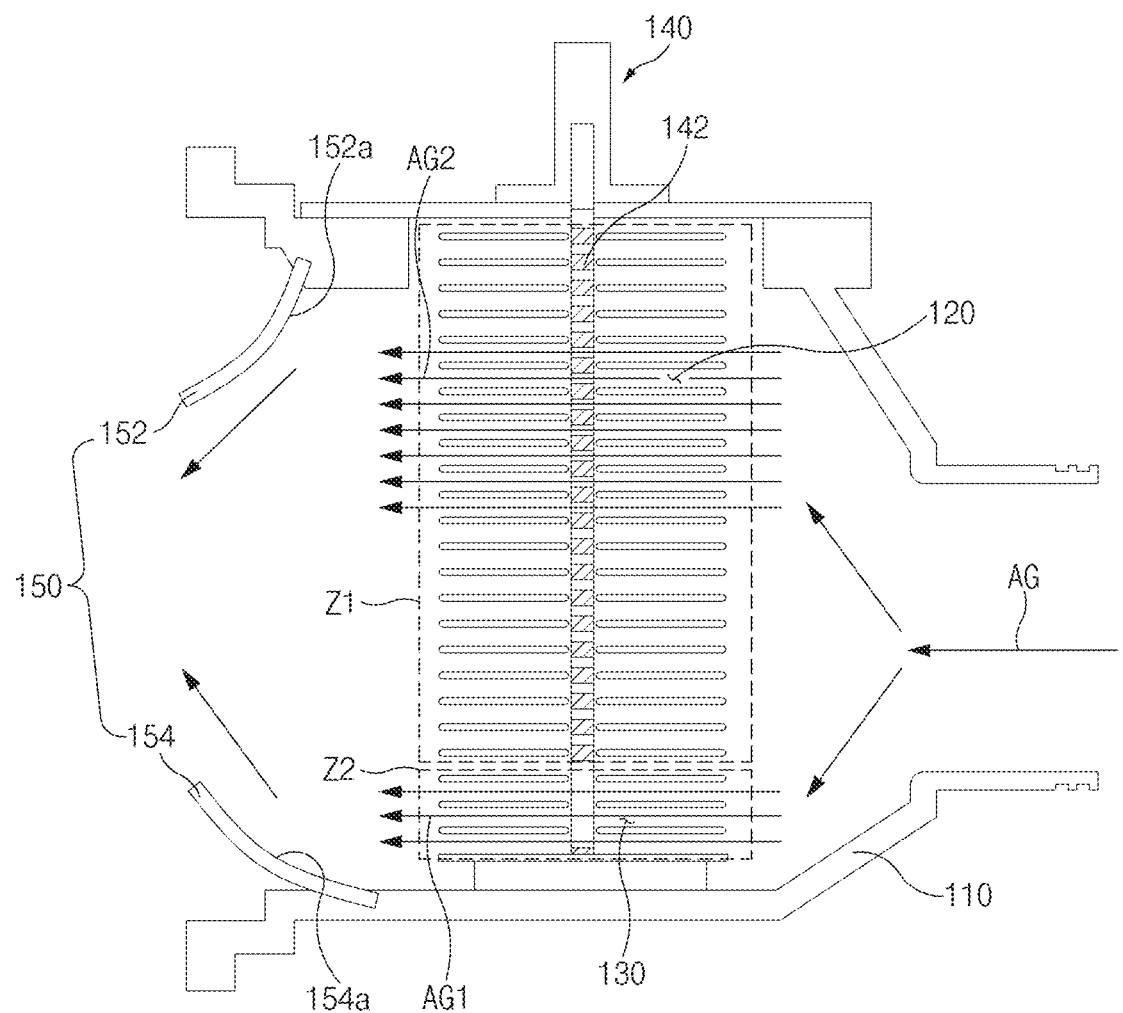
FIG. 9 is a view for explaining an air guide of the fuel cell system according to an embodiment of the present disclosure.

Referring to FIG. 9, according to the exemplary embodiment of the present disclosure, the fuel cell system 10 may include an air guide 150 disposed in the cooler main body 110. The air guide 150 is positioned at the downstream side from the cooling flow path 120 and the bypass flow path 130, and configured to mix the air having passed through the cooling flow path 120 and the air having passed through the bypass flow path 130.

As described above, the air guide 150 may be disposed at the downstream side from the cooling flow path 120 and the bypass flow path 130 and mix the air AG2 having passed through the cooling flow path 120 and the air AG1 having passed through the bypass flow path 130. Therefore, the temperature of the air AG1 and AG2 to be supplied to the humidifier 30 may be uniformly maintained, which makes it possible to more accurately control the degree of humidification of the air.

The air guide 150 may have various structures capable of mixing the air AG2 having passed through the cooling flow path 120 and the air AG1 having passed through the bypass flow path 130. The present disclosure is not restricted or limited by the structure of the air guide 150.

For example, the air guide 150 may include a first guide member 152 disposed in the cooler main body 110 and having a first inclined guide surface facing the bypass flow path 130, and a second guide member 154 disposed in the cooler main body 110, facing the first guide member 152, and having a second inclined guide surface facing the cooling flow path 120.

The first and second guide members 152 and 154 may collectively form an outlet port having a cross-sectional area that gradually decreases from one end (inlet) thereof to the other end (outlet) thereof. The air AG2 having passed through the cooling flow path 120 and the air AG1 having passed through the bypass flow path 130 may be uniformly mixed while moving along the first and second guide members 152 and 154.

Figure 10:
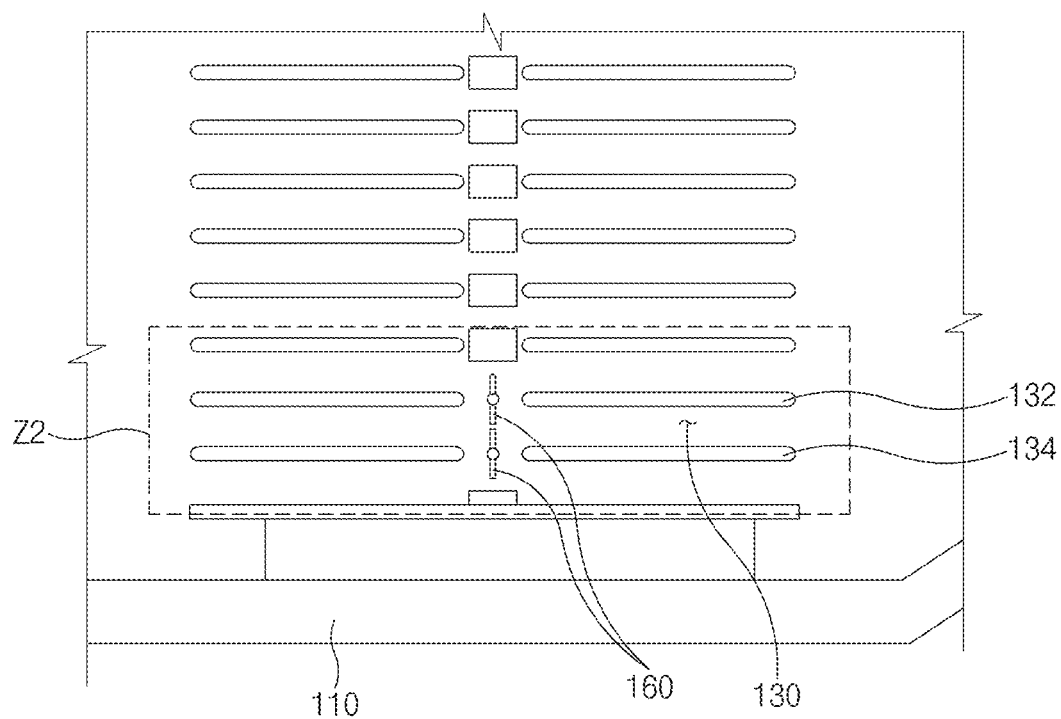
FIGS. 10 and 11 are views for explaining a variable valve of the fuel cell system according to one embodiment of the present disclosure.
Figure 11:
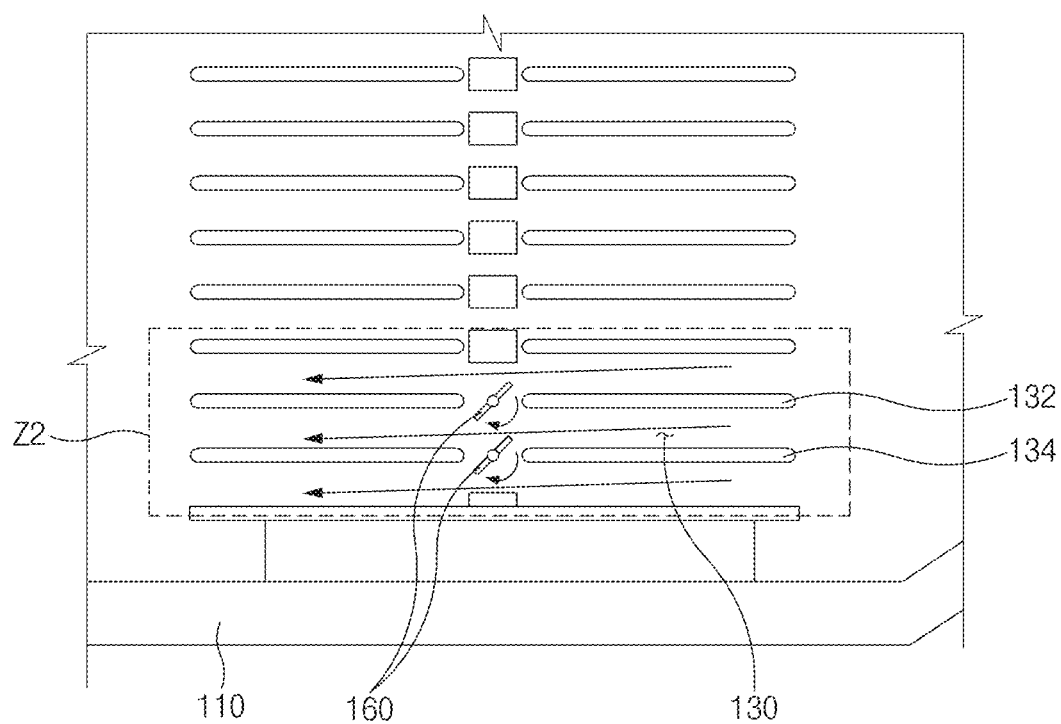

Referring to FIGS. 10 and 11, according to the exemplary embodiment of the present disclosure, the fuel cell system 10 may include variable valves 160 disposed in the bypass flow paths 130 and configured to selectively change the air passage areas of the bypass flow paths 130.

In this case, the configuration in which the air passage area of the bypass flow path 130 is selectively changed may mean that an area in which the air may pass through the bypass flow path 130 (an opening degree of the bypass flow path 130) is increased or decreased by the variable valve 160.

The variable valve 160 may have various structures capable of turning on or off the flow of air passing through the bypass flow path 130 or adjusting the flow rate of the air passing through the bypass flow path 130. The present disclosure is not restricted or limited by the structure of the variable valve 160.

For example, the variable valve 160 may be provided in the form of a circular plate having a predetermined diameter and change the cross-sectional area of the bypass flow path 130 (the air passage area of the bypass flow path 130) by rotating from a closed position at which the bypass flow path 130 is closed to an opened position at which the bypass flow path 130 is opened.

For reference, in the embodiment of the present disclosure, the configuration in which the bypass flow path 130 is opened may include both a configuration in which the bypass flow path 130 is fully opened and a configuration in which a part of the bypass flow path 130 is partially opened.

For example, as illustrated in FIG. 10, the bypass flow path 130 may be closed in a state in which the variable valve 160 is disposed perpendicularly to the bypass flow path 130 (at the closed position). In contrast, as illustrated in FIG. 11, the bypass flow path 130 may be opened in a state in which the variable valve 160 is disposed to be inclined with respect to a vertical line perpendicular to the bypass flow path 130 (or the variable valve 160 is disposed in parallel with the bypass flow path 130).

In this case, the rotation of the variable valve 160 (the rotation from the opened position to the closed position) may be performed manually by an operator or performed by a spring or magnet. The present disclosure is not restricted or limited by the rotational structure of the variable valve 160.

As described above, the variable valve 160 may be disposed in the bypass flow path 130, and selectively change the air passage area of the bypass flow path 130, which makes it possible to adjust the flow rate of the air passing through the bypass flow path 130.

Therefore, a ratio of the air AG1 having passed through the bypass flow path 130 to the air AG2 having passed through the cooling flow path 120 (a ratio of non-cooled air to cooled air) may be selectively adjusted depending on the operating condition of the fuel cell stack 20. Therefore, it is possible to obtain an advantageous effect of more accurately adjusting the water balance of the fuel cell stack 20.

Figure 12:
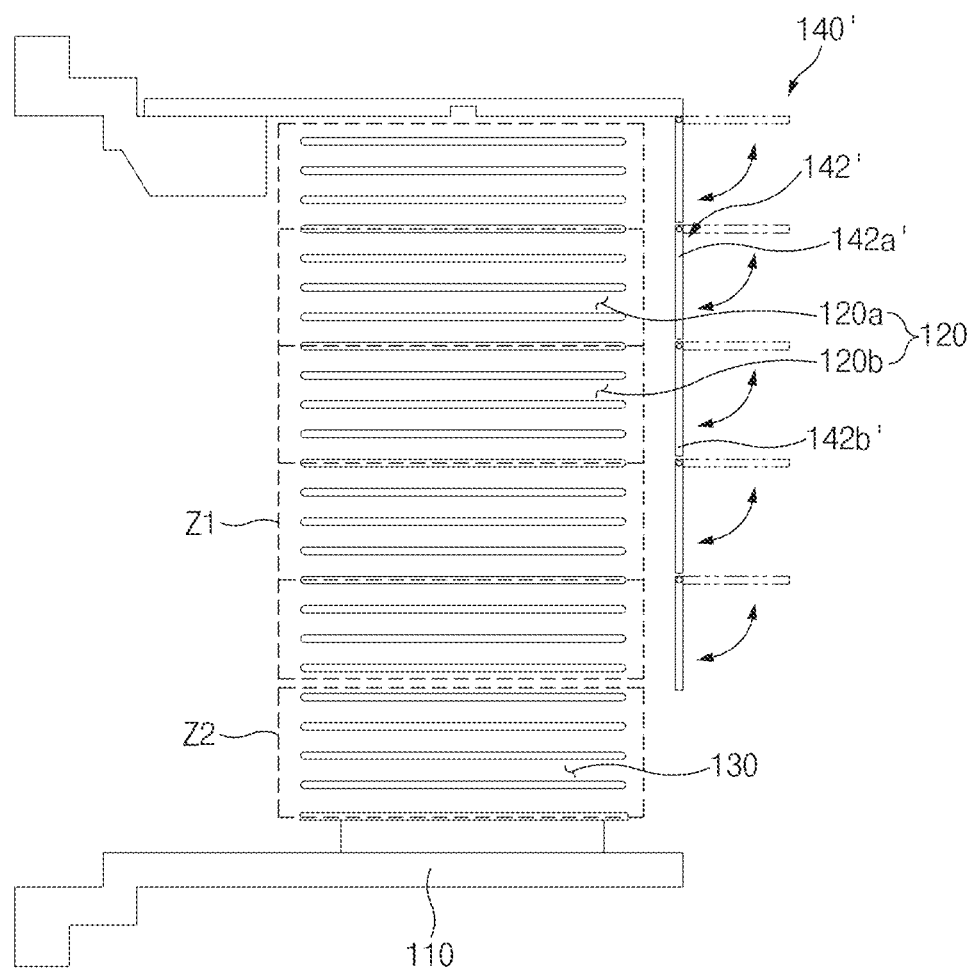
FIGS. 12 and 13 are views for explaining a shutter unit of the fuel cell system according to one embodiment of the present disclosure.
Figure 13:
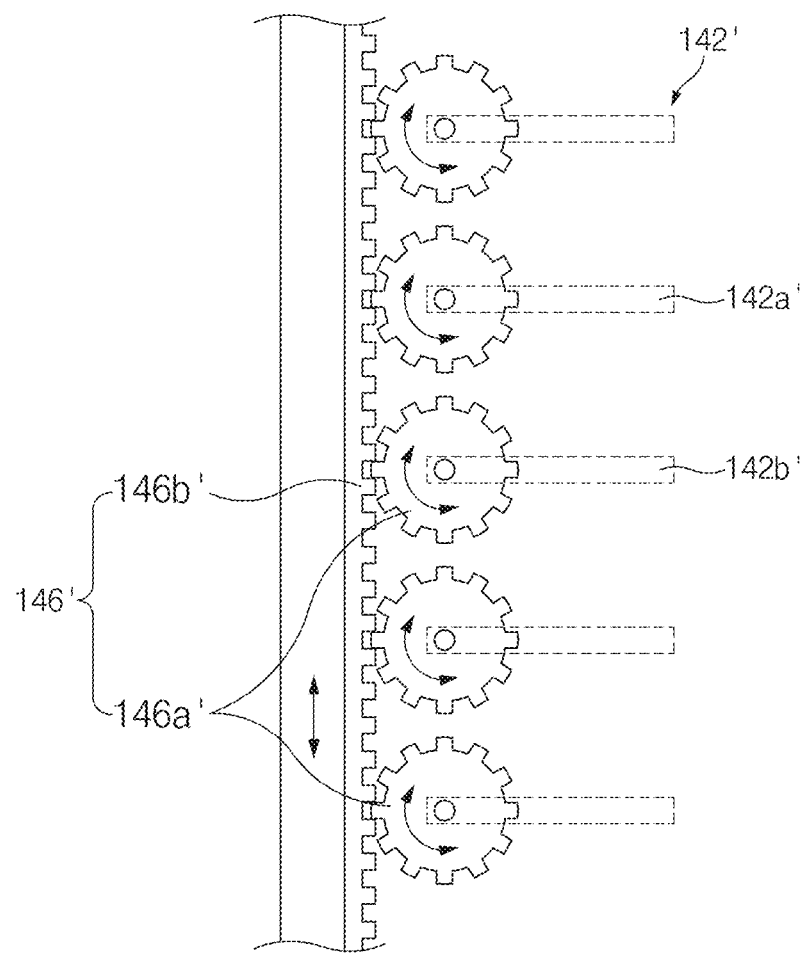

Referring to FIGS. 12 and 13, according to another exemplary embodiment of the present disclosure, the fuel cell system 10 may include the cooler main body 110, the cooling flow paths 120, the bypass flow paths 130, and the opening/closing unit 140. The opening/closing unit 140 may include shutter parts 142' disposed at inlet ends of the cooling flow paths 120 so as to be movable from the first position at which the cooling flow paths 120 are opened to the second position at which the cooling flow paths 120 are closed.

In one embodiment, the shutter part 142' may be applied instead of the valve member 142. In another embodiment, the shutter part 142' and the valve member 142 may be applied together. In other embodiment, the opening/closing unit 140 may include the shutter part 142' instead of the valve member 142.

The shutter part 142' may have various structures capable of opening or closing the inlet ends (the right ends based on FIG. 12) of the cooling flow paths 120. The present disclosure is not restricted or limited by the structure and shape of the shutter part 142'.

For example, the shutter part 142' may include a first shutter member 142a' configured to rotate from the first position to the second position, and a second shutter member 142b' disposed separately from the first shutter member 142a' and configured to rotate from the first position to the second position.

For example, the first and second shutter members 142a' and 142b' may each be provided in the form of a quadrangular plate and rotated relative to the cooler main body 110 about a rotary pin (not illustrated) connected to one end thereof.

Based on FIG. 12, the inlet ends of the cooling flow paths 120 may be opened in a state in which the first and second shutter members 142a' and 142b' are horizontally disposed (at the first position), and the inlet ends of the cooling flow paths 120 may be closed in a state in which the first and second shutter members 142a' and 142b' are vertically disposed.

In particular, the first and second shutter members 142a' and 142b' may be simultaneously rotated by a single driving source (not illustrated). For example, referring to FIG. 13, the first and second shutter members 142a' and 142b' may be simultaneously rotated by means of a power transmission part 146' including a rack gear 146b' configured to be rectilinearly moved in the upward/downward direction by the driving source (not illustrated), and pinion gears 146a' connected to the plurality of shutter members (e.g., the first shutter members and the second shutter members) and configured to engage with the rack gear 146b' and convert the rectilinear movement of the rack gear 146b' into the rotations of the shutter members (the first shutter members and the second shutter members).

According to another embodiment of the present disclosure, the plurality of shutter members (e.g., the first shutter members and the second shutter member) may be separately opened or closed by different driving sources. In another embodiment, the plurality of shutter members may be rotated by the driving source by means of other power transmission members.

According to another exemplary embodiment of the present disclosure, the cooling flow paths 120 may include first flow paths 120a configured to cool the air, and second flow paths 120b partitioned off from the first flow paths 120a and configured to cool the air separately from the first flow paths 120a. The first shutter member 142a' may selectively open or close the first flow paths 120a, and the second shutter member 142b' may selectively open or close the second flow paths 120b independently of the first shutter member 142a'.

As described above, the cooling flow paths 120 may be partitioned into the first flow paths 120a and the second flow paths 120b, and the plurality of flow paths (the first flow paths and the second flow paths) may be individually opened or closed by the first and second shutter members 142a' and 142b'. Therefore, the different heat exchange performances (performances in cooling the air) may be implemented by the first and second flow paths 120a and 120b (e.g., the fin density of the heat exchange fins disposed in the first flow paths and the fin density of the heat exchange fins disposed in the second flow paths are different from each other). Therefore, only any one of the first flow path 120a and the second flow path 120b may be selectively opened or closed under a condition in which the water balance of the fuel cell stack 20 may be optimized depending on the operating condition of the fuel cell stack 20.

According to the embodiment of the present disclosure described above, it is possible to obtain an advantageous effect of simplifying the structure and optimizing the water balance of the fuel cell stack.

In particular, according to the embodiment of the present disclosure, it is possible to adjust the water balance of the fuel cell stack by selectively changing the area for heat exchange between the air cooler and the air depending on the operating condition of the fuel cell stack.

In addition, according to the embodiment of the present disclosure, it is possible to reduce or minimize the increase in differential pressure of the air to be supplied to the humidifier and improve the energy efficiency.

In addition, according to the embodiment of the present disclosure, it is possible to obtain an advantageous effect of accurately adjusting the water balance of the fuel cell stack depending on the operating condition of the fuel cell stack.

In addition, according to the embodiment of the present disclosure, it is possible to obtain an advantageous effect of simplifying the structure and manufacturing process and improving the degree of design freedom and spatial utilization.

In addition, according to the embodiment of the present disclosure, it is possible to obtain an advantageous effect of adjusting the water balance of the fuel cell stack depending on the operating condition of the fuel cell stack without providing a separate bypass flow path outside the air cooler.

In addition, according to the embodiment of the present disclosure, it is possible to improve the stability, reliability and the responsiveness in adjusting the temperature of the air.

While the embodiments have been described above, the embodiments are just illustrative and not intended to limit the present disclosure. It can be appreciated by those having ordinary skill in the art that various modifications and applications, which are not described above, may be made to the present embodiment without departing from the intrinsic features of the present embodiment. For example, the respective constituent elements specifically described in the embodiments may be modified and then carried out. Further, it should be interpreted that the differences related to the modifications and applications are included in the scope of the present disclosure.

What is claimed is:

1. An air cooler comprising:
   a cooler main body having a first zone and a second zone partitioned off from the first zone;
   cooling flow paths configured to cool the air and disposed in the first zone so that the air introduced into the cooler main body passes therethrough;
   bypass flow paths configured to allow the air to bypass the cooling flow paths and disposed in the second zone so that the air introduced into the cooler main body passes therethrough; and
   an opening/closing unit configured to selectively open or close the cooling flow paths.

2. The air cooler of claim 1, comprising:
   a first tube member disposed in the first zone and configured to circulate a coolant that exchanges heat with the air; and
   a second tube member disposed in the first zone, spaced apart from the first tube member, and configured to circulate the coolant,
   wherein the cooling flow path is defined between the first tube member and the second tube member.

3. The air cooler of claim 1, wherein the opening/closing unit comprises:
   a valve member disposed in the cooler main body and configured to be movable from a first position at which the cooling flow path is opened to a second position at which the cooling flow path is closed;

a driving source configured to provide driving power for moving the valve member from the first position to the second position; and a power transmission part configured to transmit the driving power of the driving source to the valve member.

4. The air cooler of claim 3, wherein the valve member rectilinearly moves from the first position to the second position.

5. The air cooler of claim 3, wherein the power transmission part comprises:

a pinion gear configured to be rotated by the driving source; and a rack gear connected to the valve member and configured to engage with the pinion gear and convert a rotation of the pinion gear into a rectilinear movement of the valve member.

6. The air cooler of claim 2, further comprising: heat exchange fins disposed on an outer surface of the first tube member and an outer surface of the second tube member and configured to exchange heat with the air.

7. The air cooler of claim 2, further comprising:

a first bypass tube member disposed in the second zone; and a second bypass tube member disposed in the second zone and spaced apart from the first bypass tube member, wherein the bypass flow path is defined between the first bypass tube member and the second bypass tube member.

8. The air cooler of claim 7, further comprising:

bypass heat exchange fins disposed on an outer surface of the first bypass tube member and an outer surface of the second bypass tube member and configured to exchange heat with the air.

9. The air cooler of claim 8, further comprising:

heat exchange fins disposed on an outer surface of the first tube member and an outer surface of the second tube member and configured to exchange heat with the air, wherein the bypass heat exchange fins are disposed with a lower fin density per unit area than a fin density of the heat exchange fins.

10. The air cooler of claim 1, further comprising:

an air guide disposed in the cooler main body, positioned at a downstream side from the cooling flow path and the bypass flow path, and configured to mix the air having passed through the cooling flow path and the air having passed through the bypass flow path.

11. The air cooler of claim 10, wherein the air guide comprises:

a first guide member disposed in the cooler main body and having a first inclined guide surface facing the bypass flow path; and a second guide member disposed in the cooler main body, facing the first guide member, and having a second inclined guide surface facing the cooling flow path.

12. The air cooler of claim 1, further comprising:

a variable valve disposed in the bypass flow path and configured to selectively change an air passage area of the bypass flow path.

13. The air cooler of claim 12, wherein the variable valve is rotatable from a closed position at which the bypass flow path is closed to an opened position at which the bypass flow path is opened.

14. The air cooler of claim 1, wherein the opening/closing unit comprises a shutter part disposed at an inlet end of the cooling flow path so as to be movable from a first position at which the cooling flow path is opened to a second position at which the cooling flow path is closed.

15. The air cooler of claim 14, wherein the shutter part comprises:

a first shutter member configured to rotate from the first position to the second position; and a second shutter member disposed separately from the first shutter member and configured to rotate from the first position to the second position.

16. The air cooler of claim 15, wherein the cooling flow paths comprise:

a first flow path configured to cool the air; and a second flow path partitioned off from the first flow path and configured to cool the air separately from the first flow path, and wherein the first shutter member selectively opens or closes the first flow path, and the second shutter member selectively opens or closes the second flow path.

17. A fuel cell system comprising:

a fuel cell stack;

a humidifier configured to humidify air to be supplied to the fuel cell stack; and an air cooler configured to selectively cool the air to be supplied to the humidifier, wherein the air cooler comprises:

a cooler main body having a first zone and a second zone partitioned off from the first zone;

cooling flow paths configured to cool the air and disposed in the first zone so that the air introduced into the cooler main body passes therethrough;

bypass flow paths configured to allow the air to bypass the cooling flow paths and disposed in the second zone so that the air introduced into the cooler main body passes therethrough; and an opening/closing unit configured to selectively open or close the cooling flow paths.

* * * * *